UNITED STATES PATENT OFFICE.

FRITZ DIEBOLD, OF ZURICH, SWITZERLAND.

PROCESS FOR PRODUCING DISPERSED SYSTEMS.

1,295,283.      Specification of Letters Patent.    Patented Feb. 25, 1919.

No Drawing.     Application filed November 26, 1918. Serial No. 264,283.

*To all whom it may concern:*

Be it known that I, FRITZ DIEBOLD, a citizen of the Republic of Switzerland, residing at Zurich, Talstrasse 11, Switzerland, have invented certain new and useful Improvements in Processes for Producing Dispersed Systems; and I do hereby declare the following to be a clear, full, and exact description of the invention, such as will enable others skilled in the art to which it appertains to make and use the same.

This invention relates to a process for producing dispersed systems, for instance colloidal solutions, emulsions, suspensions, jelly, gelatins and the like.

The process is based on the fact, that it is possible to divide substances into such fine particles by means of pure mechanical atomization that they can be incorporated forthwith into the dispersion medium.

According to this invention the substance is atomized in a mechanical manner and is then incorporated in this condition, forming the dispersed phase into the dispersion medium.

When liquid substances have to be treated, the liquid can be directly atomized. In case solid substances have to be treated, they are converted at first preferably into the liquid condition in order that they may be atomized. To this end the solid substance can be dissolved for instance in a suitable solvent. It is advisable to choose as solvent a substance which is adapted to separate from the dissolved substance after the atomizing process has been carried out, the substance set free forming then the dispersed phase. The solid substance can also be liquefied by melting it, or it may be converted in any other suitable manner into the liquid condition.

The process can be carried into effect for instance according to the following examples:

Example 1: Stearin is dissolved in ether and the solution is brought from above within reach of a current of air flowing at a very great velocity out of an aperture of any suitable shape. The solution is thereby atomized into very small drops. The ether contained in these drops will then evaporate, so that the rest of the drops consists of particles of stearin which are suspended in air. These particles forming the dispersed phase in one medium, such as air, are incorporated into a different dispersion medium, for instance into water, by causing the current of air containing the atomized stearin to pass through the water. The greatest portion of the stearin remains then suspended in the water.

Example 2: Stearin is converted into the liquid condition by melting it; in this condition it is then atomized in the same manner as the solution of the first example by means of a current of air having a very great velocity. In this manner it is possible to obtain directly dispersed particles of stearin. The air containing this dispersed phase is caused to pass through water.

When requisite, the dispersed phase can be charged with electricity. This can be effected in any suitable known manner, for instance by means of the action of ions, radiation, influence, point discharges and the like.

Example 3: The supply pipe for compressed air provided with a nozzle-like aperture is grounded. An insulated metallic ring is arranged at a certain distance in front of said aperture, the particles of stearin atomized by means of the compressed air being caused to pass through said ring. When the latter is charged for instance with negative electricity supplied by a high tension continuous current battery, it influences the pipe and it binds in the surface, in which is arranged said nozzle, the positive electricity, while the negative electricity flows off. Each particle of stearin supplied sidewise to the current of air and coming in contact with said surface takes up, while the dispersion is taking place, a portion of the positive charge. As a result of this, the dispersed particles of stearin have a tendency to repel one another, the durability or life of the suspension being thereby increased.

What I claim as my invention is:

1. The process of producing dispersed systems, which consists in atomizing a substance within one medium and incorporating the atomized substance in a dispersion medium in which said substance is insoluble but in which it remains in suspension.

2. The process of producing dispersed systems, consisting in dissolving a solid body in a solvent, atomizing the solution in a mechanical manner and incorporating the atomized substance forming the dispersed phase into the dispersion medium, the solvent used being of such a nature that it separates from the dissolved body upon its atomization.

3. The process of producing dispersed systems, which consists in converting a solid substance into a liquid condition, atomizing the substance and incorporating the atomized substance in a dispersion medium in which it remains in suspension.

4. The process of producing dispersed systems, consisting in atomizing a substance in a mechanical manner, the substance forming in the atomized condition the dispersed phase, charging the latter with electricity and incorporating the atomized substance into the dispersion medium.

5. The process of producing dispersed systems, comprising atomizing a substance and incorporating the atomized substance by means of a gaseous medium in a dispersion liquid.

In testimony that I claim the foregoing as my invention I have signed my name.

FRITZ DIEBOLD.